United States Patent
Dunn

(10) Patent No.: US 11,522,887 B2
(45) Date of Patent: Dec. 6, 2022

(54) ARTIFICIAL INTELLIGENCE CONTROLLER ORCHESTRATING NETWORK COMPONENTS FOR A CYBER THREAT DEFENSE

(71) Applicant: Darktrace Limited, Cambridge (GB)

(72) Inventor: Matthew Dunn, Cambridgeshire (GB)

(73) Assignee: Darktrace Holdings Limited, Cambridge (GB)

( * ) Notice: Subject to any disclaimer, the term of this patent is extended or adjusted under 35 U.S.C. 154(b) by 795 days.

(21) Appl. No.: 16/279,067

(22) Filed: Feb. 19, 2019

(65) Prior Publication Data

US 2019/0260786 A1 Aug. 22, 2019

Related U.S. Application Data

(60) Provisional application No. 62/632,623, filed on Feb. 20, 2018.

(51) Int. Cl.
*H04L 29/06* (2006.01)
*G06N 20/10* (2019.01)
(Continued)

(52) U.S. Cl.
CPC ........ *H04L 63/1425* (2013.01); *G06F 3/0486* (2013.01); *G06F 3/04842* (2013.01);
(Continued)

(58) Field of Classification Search
CPC ... H04L 63/1425; H04L 41/22; H04L 43/045; H04L 51/12; H04L 51/22; H04L 63/0209;
(Continued)

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.
(Continued)

*Primary Examiner* — Fatoumata Traore
*Assistant Examiner* — Thomas A Gyorfi
(74) *Attorney, Agent, or Firm* — Rutan and Tucker, LLP

(57) ABSTRACT

A cyber-threat coordinator-component identifies devices and/or users that are in a breach state of a benchmark of parameters, utilized by AI models, that correspond to the normal pattern of life for the network. The cyber-threat coordinator-component sends an external communication to selected network devices in order to initiate actions with that network device in order to change a behavior of a detected threat of at least one a user and/or a device acting abnormal to the normal pattern of life on the network. The initiated actions are also targeted to minimize an impact on other network devices and users that are i) currently active in the network and ii) that are not in breach of being outside the normal behavior benchmark.

16 Claims, 8 Drawing Sheets

(51) Int. Cl.

| | | |
|---|---|---|
| *H04L 9/40* | (2022.01) | |
| *G06N 20/00* | (2019.01) | |
| *G06F 21/36* | (2013.01) | |
| *H04L 43/045* | (2022.01) | |
| *G06F 16/2455* | (2019.01) | |
| *G06F 3/04842* | (2022.01) | |
| *G06F 3/0486* | (2013.01) | |
| *H04L 41/22* | (2022.01) | |
| *G06K 9/62* | (2022.01) | |
| *G06F 40/40* | (2020.01) | |
| *G06V 30/10* | (2022.01) | |
| *H04L 51/42* | (2022.01) | |
| *H04L 51/212* | (2022.01) | |
| *H04L 51/224* | (2022.01) | |
| *G06N 20/20* | (2019.01) | |

(52) U.S. Cl.
CPC .......... *G06F 16/2455* (2019.01); *G06F 21/36* (2013.01); *G06F 40/40* (2020.01); *G06K 9/622* (2013.01); *G06K 9/6218* (2013.01); *G06N 20/00* (2019.01); *G06N 20/10* (2019.01); *G06V 30/10* (2022.01); *H04L 41/22* (2013.01); *H04L 43/045* (2013.01); *H04L 51/212* (2022.05); *H04L 51/224* (2022.05); *H04L 51/42* (2022.05); *H04L 63/0209* (2013.01); *H04L 63/0428* (2013.01); *H04L 63/101* (2013.01); *H04L 63/14* (2013.01); *H04L 63/1416* (2013.01); *H04L 63/1433* (2013.01); *H04L 63/1441* (2013.01); *H04L 63/1483* (2013.01); *H04L 63/20* (2013.01); *G06N 20/20* (2019.01)

(58) Field of Classification Search
CPC ... H04L 63/0428; H04L 63/101; H04L 63/14; H04L 63/1416; H04L 63/1433; H04L 63/1441; H04L 63/20; H04L 51/18; H04L 67/12; G06F 3/04842; G06F 3/0486; G06F 16/2455; G06F 21/36; G06F 21/554; G06F 21/556; G06F 40/40; G06N 20/00; G06N 20/10; G06N 20/20; G06K 9/6218; G06K 9/622
See application file for complete search history.

(56) References Cited

U.S. PATENT DOCUMENTS

| | | | |
|---|---|---|---|
| 7,307,999 | B1 | 12/2007 | Donaghey |
| 7,418,731 | B2 | 8/2008 | Touboul |
| 7,448,084 | B1 | 11/2008 | Apap et al. |
| 8,312,540 | B1 | 11/2012 | Kahn et al. |
| 8,819,803 | B1 | 8/2014 | Richards et al. |
| 8,879,803 | B2 | 11/2014 | Ukil et al. |
| 8,966,036 | B1 | 2/2015 | Asgekar et al. |
| 9,043,905 | B1 | 5/2015 | Allen et al. |
| 9,106,687 | B1 | 8/2015 | Sawhney et al. |
| 9,185,095 | B1 | 11/2015 | Moritz et al. |
| 9,213,990 | B2 | 12/2015 | Adjaoute |
| 9,401,925 | B1 | 7/2016 | Guo et al. |
| 9,516,039 | B1 | 12/2016 | Yen et al. |
| 9,516,053 | B1 * | 12/2016 | Muddu ............... H04L 63/1416 |
| 9,641,544 | B1 | 5/2017 | Treat et al. |
| 9,712,548 | B2 | 7/2017 | Shmueli et al. |
| 9,727,723 | B1 | 8/2017 | Kondaveeti et al. |
| 2002/0186698 | A1 | 12/2002 | Ceniza |
| 2003/0070003 | A1 | 4/2003 | Chong et al. |
| 2004/0083129 | A1 | 4/2004 | Herz |
| 2004/0167893 | A1 | 8/2004 | Matsunaga et al. |
| 2005/0065754 | A1 | 3/2005 | Schaf et al. |
| 2007/0118909 | A1 | 5/2007 | Hertzog et al. |
| 2007/0294187 | A1 | 12/2007 | Scherrer |
| 2008/0005137 | A1 | 1/2008 | Surendran et al. |
| 2008/0109730 | A1 | 5/2008 | Coffman et al. |
| 2009/0106174 | A1 | 4/2009 | Battisha et al. |
| 2009/0254971 | A1 | 10/2009 | Herz et al. |
| 2010/0009357 | A1 | 1/2010 | Nevins et al. |
| 2010/0095374 | A1 | 4/2010 | Gillum et al. |
| 2010/0125908 | A1 | 5/2010 | Kudo |
| 2010/0235908 | A1 | 9/2010 | Eynon et al. |
| 2010/0299292 | A1 | 11/2010 | Collazo |
| 2011/0093428 | A1 | 4/2011 | Wisse |
| 2011/0213742 | A1 | 9/2011 | Lemmond et al. |
| 2011/0261710 | A1 | 10/2011 | Chen et al. |
| 2012/0096549 | A1 | 4/2012 | Amini et al. |
| 2012/0137367 | A1 | 5/2012 | Dupont et al. |
| 2012/0209575 | A1 | 8/2012 | Barbat et al. |
| 2012/0210388 | A1 | 8/2012 | Kolishchak |
| 2012/0284791 | A1 | 11/2012 | Miller et al. |
| 2012/0304288 | A1 | 11/2012 | Wright et al. |
| 2013/0091539 | A1 | 4/2013 | Khurana et al. |
| 2013/0198119 | A1 | 8/2013 | Eberhardt, III et al. |
| 2013/0198840 | A1 | 8/2013 | Drissi et al. |
| 2013/0254885 | A1 | 9/2013 | Devost |
| 2014/0007237 | A1 | 1/2014 | Wright et al. |
| 2014/0074762 | A1 | 3/2014 | Campbell |
| 2014/0165207 | A1 | 6/2014 | Engel et al. |
| 2014/0215618 | A1 | 7/2014 | Amit |
| 2014/0325643 | A1 | 10/2014 | Bart et al. |
| 2015/0067835 | A1 | 3/2015 | Chari et al. |
| 2015/0081431 | A1 | 3/2015 | Akahoshi et al. |
| 2015/0161394 | A1 | 6/2015 | Ferragut et al. |
| 2015/0163121 | A1 | 6/2015 | Mahaffey et al. |
| 2015/0172300 | A1 | 6/2015 | Cochenour |
| 2015/0180893 | A1 | 6/2015 | Im et al. |
| 2015/0213358 | A1 | 7/2015 | Shelton et al. |
| 2015/0286819 | A1 | 10/2015 | Coden et al. |
| 2015/0310195 | A1 | 10/2015 | Bailor et al. |
| 2015/0319185 | A1 * | 11/2015 | Kirti ............... H04L 67/306 726/23 |
| 2015/0341379 | A1 | 11/2015 | Lefebvre et al. |
| 2015/0363699 | A1 | 12/2015 | Nikovski |
| 2015/0379110 | A1 | 12/2015 | Marvasti et al. |
| 2016/0062950 | A1 | 3/2016 | Brodersen et al. |
| 2016/0078365 | A1 | 3/2016 | Baumard |
| 2016/0149941 | A1 | 5/2016 | Thakur et al. |
| 2016/0164902 | A1 | 6/2016 | Moore |
| 2016/0173509 | A1 | 6/2016 | Ray et al. |
| 2016/0241576 | A1 | 8/2016 | Rathod et al. |
| 2016/0352768 | A1 | 12/2016 | Lefebvre et al. |
| 2016/0373476 | A1 | 12/2016 | Dell'Anno et al. |
| 2017/0063907 | A1 | 3/2017 | Muddu et al. |
| 2017/0063910 | A1 | 3/2017 | Muddu et al. |
| 2017/0063911 | A1 | 3/2017 | Muddu et al. |
| 2017/0169360 | A1 | 6/2017 | Veeramachaneni et al. |
| 2017/0220801 | A1 | 8/2017 | Stockdale et al. |
| 2017/0230391 | A1 | 8/2017 | Ferguson et al. |
| 2017/0230392 | A1 | 8/2017 | Stockdale |
| 2017/0251012 | A1 | 8/2017 | Stockdale et al. |
| 2017/0270422 | A1 | 9/2017 | Sorakado |
| 2018/0027006 | A1 | 1/2018 | Zimmermann et al. |
| 2018/0046926 | A1 * | 2/2018 | Achin ............... G06Q 10/04 |
| 2018/0167402 | A1 | 6/2018 | Scheidler et al. |
| 2018/0219894 | A1 * | 8/2018 | Crabtree ............ H04L 63/1425 |
| 2018/0255076 | A1 * | 9/2018 | Paine ............... G06F 21/57 |

FOREIGN PATENT DOCUMENTS

| | | | |
|---|---|---|---|
| WO | 2008121945 | A2 | 10/2008 |
| WO | 2013053407 | A1 | 4/2013 |
| WO | 2014088912 | A1 | 6/2014 |

(56) References Cited

FOREIGN PATENT DOCUMENTS

WO 2015027828 A1 3/2015
WO 2016020660 A1 2/2016

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

* cited by examiner

ARTIFICIAL INTELLIGENCE CONTROLLER ORCHESTRATING NETWORK COMPONENTS FOR A CYBER THREAT DEFENSE

RELATED APPLICATION

This application claims priority to and the benefit of under 35 USC 119 of U.S. provisional patent application titled "A cyber threat defense system with various improvements," filed Feb. 20, 2018, Ser. No. 62/632,623, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system.

BACKGROUND

In the cyber security environment, firewalls, endpoint security methods and other tools such as SIEMs and sandboxes are deployed to enforce specific policies, and provide protection against certain threats. These tools currently form an important part of an organization's cyber defense strategy, but they are insufficient in the new age of cyber threat. Legacy tools are failing to deal with new cyber threats because the traditional approach relies on being able to pre-define the cyber threat in advance, by writing rules or producing signatures. In today's environment, this approach to defend against cyber threats is fundamentally flawed:

- Threats are constantly evolving—novel attacks do not match historical-attack "signatures", and even subtle changes to previously understood attacks can result in them going undetected by legacy defenses;
- Rules and policies defined by organizations are continually insufficient—security teams simply can't imagine every possible thing that may go wrong in future; and
- Employee 'insider' threat is a growing trend—it is difficult to spot malicious employees behaving inappropriately as they are a legitimate presence on the business network.

The reality is that modern threats bypass the traditional legacy defense tools on a daily basis. These tools need a new tool based on a new approach that can complement them and mitigate their deficiencies at scale across the entirety of digital organizations. In the complex modern world it is advantageous that the approach is fully automated as it is virtually impossible for humans to sift through the vast amount of security information gathered each minute within a digital business.

SUMMARY

In an embodiment, a cyber-threat coordinator-component identifies devices and/or users that are in a breach state of a benchmark of parameters, utilized by AI models, that correspond to the normal pattern of life for the network. The cyber-threat coordinator-component sends an external communication to selected network devices in order to initiate actions with that network device in order to change/counter a behavior of a detected threat of at least one of a user and/or a device acting abnormal to the normal pattern of life on the network. The initiated actions are also targeted to minimize an impact on other network devices and users that are i) currently active in the network and ii) that are not in breach of being outside the normal behavior benchmark.

These and other features of the design provided herein can be better understood with reference to the drawings, description, and claims, all of which form the disclosure of this patent application.

DRAWINGS

The drawings refer to some embodiments of the design provided herein in which.

Figure 7:
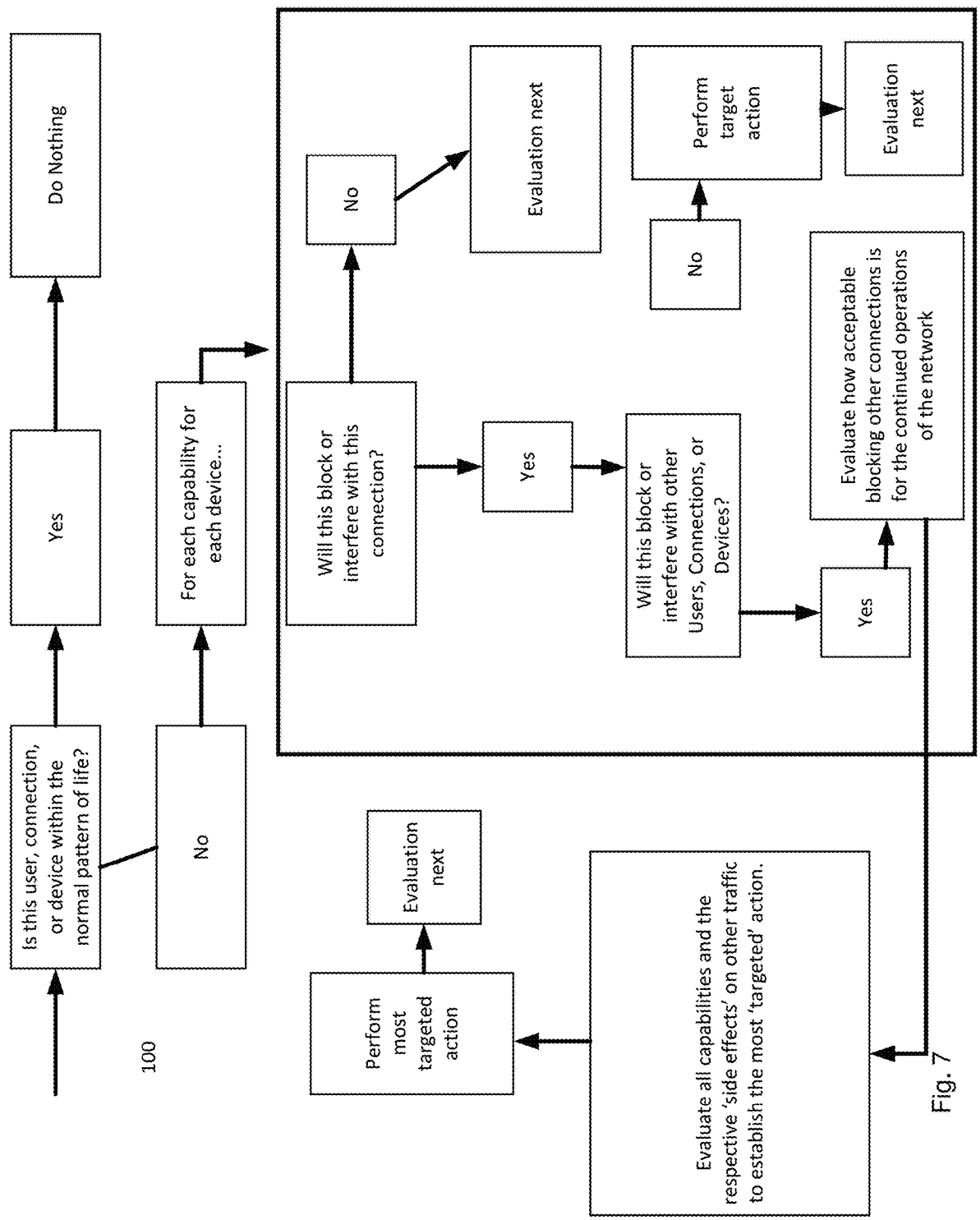

FIG. 7 illustrates a flow diagram of an embodiment of the cyber-threat coordinator-component with an example decision process to initiate a chosen set of actions to cause a best targeted change/counter of the behavior of the detected threat acting abnormal to the normal pattern of life on the network while minimizing the impact on other network devices and users that are i) currently active and ii) not in breach of being outside the normal behavior benchmark.

Figure 8:
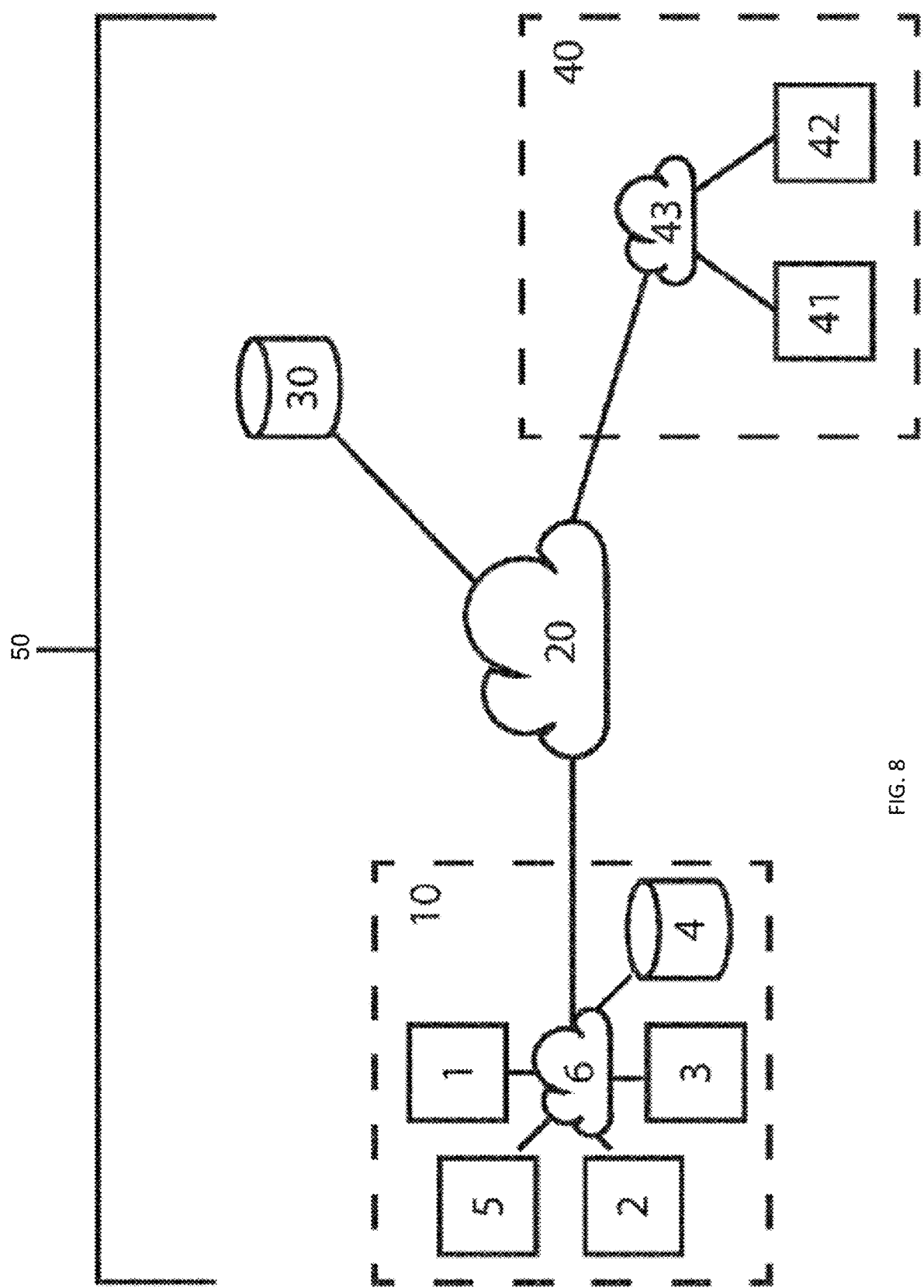

FIG. 8 illustrates an example cyber threat defense system protecting an example network.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, a cyber-threat coordinator-component identifies devices and/or users that are in a breach state of a benchmark of parameters, utilized by AI models, that correspond to the normal pattern of life for the network. The cyber-threat coordinator-component sends an external communication to selected network devices in order to initiate actions with that network device in order to change a behavior of a detected threat of at least one a user and/or a device acting abnormal to the normal pattern of life on the network. The initiated actions are also targeted to minimize an impact on other network devices and users that are i) currently active in the network and ii) that are not in breach of being outside the normal behavior benchmark.

Figure 1:
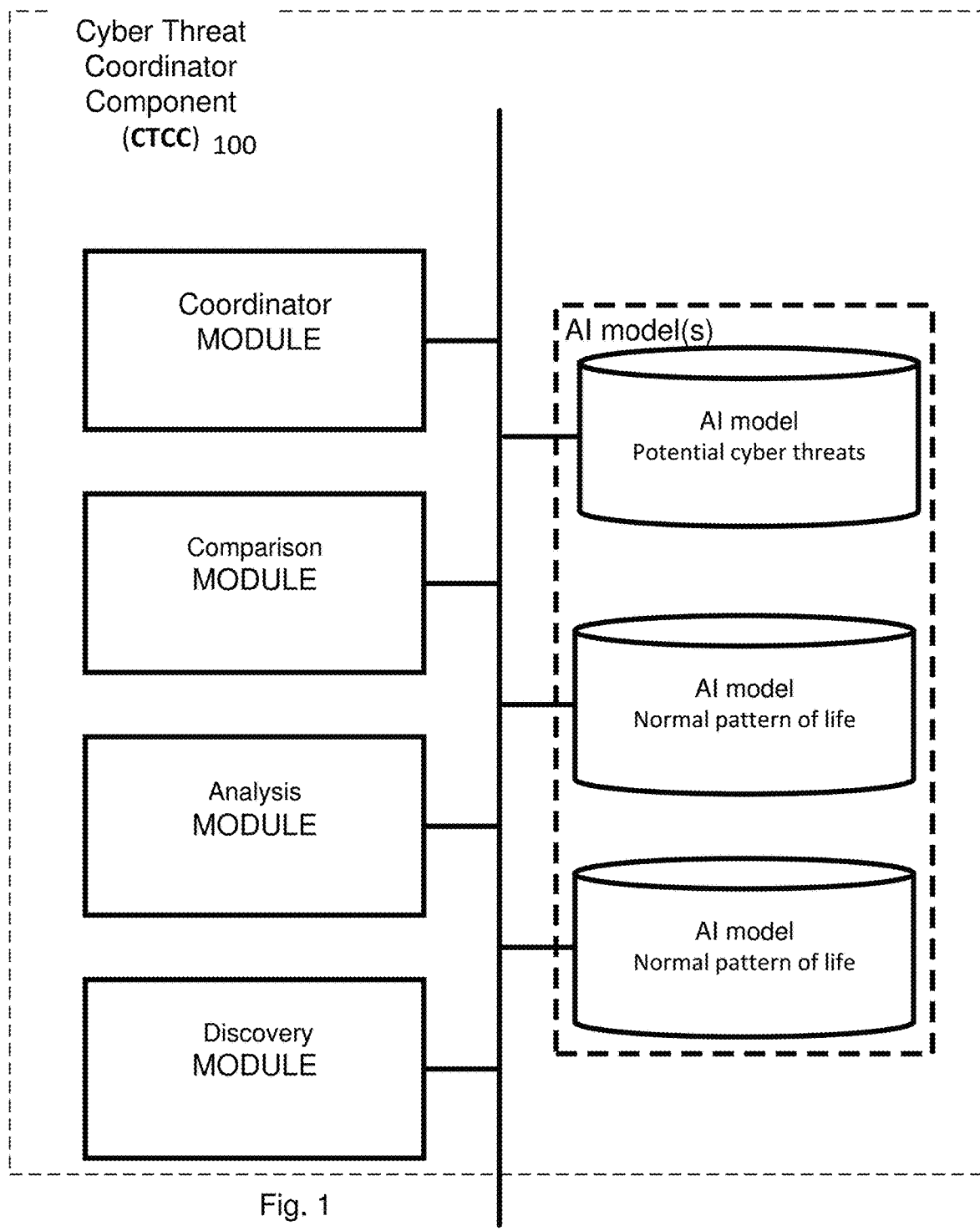
FIG. 1 illustrates a block diagram of an embodiment of a cyber-threat coordinator-component.

FIG. 1 illustrates a block diagram of an embodiment of a cyber-threat coordinator-component.

In an embodiment, the cyber-threat coordinator-component 100, such as an Antigena Network Firewall Share Component, is a real time threat intelligence system that uses one or more Artificial Intelligence models that are configured to intelligently work with other third party defense systems in that customer's network against threats. The cyber-threat coordinator-component 100 and other third party defense systems are orchestrated to create a unified defense response against a detected threat within or external to that customer's network. The cyber-threat coordinator-component 100 can be an autonomous self-learning digital response coordinator that is trained specifically to control and reconfigure the actions of traditional legacy computer defenses (e.g. firewalls, switches, proxy servers, etc.) to contain threats propagated by, or enabled by, networks and the internet.

The cyber-threat coordinator-component 100 may include the following components. One or more input ports receive input data from probes in the network, such as in-line taps or external monitoring connections, collecting data on entities associated with the network. An analysis module analyzes the input data, such metrics themselves or data derived from one or more clusters of metrics on network traffic, from the input ports using one or more self-learning Artificial Intelligence models trained on a normal behavior of users and devices associated with the network. A normal behavior benchmark can be used by a given AI model as a benchmark of parameters that correspond to a normal pattern of life for the network. The normal behavior benchmark allows that self-learning model to spot behavior on the network that falls outside the parameters set by the normal behavior benchmark. The benchmark may be continuously updated; and thus, be a moving benchmark of parameters forming that benchmark/threshold.

A comparison module compares the analyzed input data received from the probes to the benchmark of parameters that correspond to the normal pattern of life for the devices and users of the network utilized by the self-learning Artificial Intelligence models trained on the normal pattern of life for the network. The comparison module may further identify one or more devices and/or users that are in a breach state of the benchmark of parameters, utilized by the Artificial Intelligence models, which correspond to the normal pattern of life for the network.

The coordinator module sends one or more external communications to selected network devices in order to initiate actions with that network device in order to change a behavior of a detected threat of a user and/or a device acting abnormal to the normal pattern of life on the network while minimizing an impact on other network devices and users that are i) currently active in the network and ii) that are not in breach of being outside the normal behavior benchmark. Thus, the cyber-threat coordinator-component 100 may detect and initiate responses to change a behavior of a detected threat of at least one of i) a user, ii) a device, iii) both a user and a device, iv) a set of users, v) a set of devices acting abnormal to the normal pattern of life on the network, and vi) various combinations of these entities.

The cyber-threat coordinator-component 100 further uses a discovery module to i) discover capabilities of each network device in the network being monitored and ii) discover actions they can take to counter and/or contain the detected threat to the network, as well as iii) discover the communications needed to initiate those actions.

The coordinator module may then coordinate the capabilities of two or more network devices that are selected to counter the detected threat acting abnormal to the normal pattern of life by sending an external communication to each selected network device in order to initiate actions with that network device in order to change the behavior of the detected threat while minimizing the impact on other network devices and users that are i) currently active in the network and ii) that are not in breach of being outside the normal behavior benchmark.

The cyber-threat coordinator-component 100 may i) internally contain one or more of the AI models, ii) cooperate with external AI models, and have a combination of internal and external AI models. The AI models are configured to understand the normal pattern of life of the network; and thus, normal behaviors of entities, (e.g. users, network devices, connections, etc.) in the network. The AI models use one or more mathematical functions to evaluate different factors, and then choose a best set of one or more actions from all of the possible actions, and then the coordinator module is configured to use one or more Application Programming Interfaces to translate desired actions from selected network devices into a specific language and syntax utilized by that network device in order to send the communications to the selected network devices from potentially multiple different vendors to take those desired actions. The AI models may use the one or more mathematical functions to generate a score for each of the possible actions and/or sequence of multiple possible actions that can be taken in order to determine which set of actions to choose among many possible actions to take/initiate. The one or more possible actions to take and their calculated scores can be stacked against each other to factor 1) a likelihood of containing/countering the detected threat acting abnormal with each possible set of actions, 2) a severity level of the detected threat to the network, and 3) the impact of taking each possible set of actions i) on users and ii) on devices currently active in the network not acting abnormal to the normal behavior of the network. The AI models may then communicate with the coordinator module to initiate the chosen set of actions to cause a best targeted change of the behavior of the detected threat acting abnormal to the normal pattern of life on the network while minimizing the impact on other network devices and users that are i) currently active and ii) not in breach of being outside the normal behavior benchmark. The AI models can choose an initial set of one or more actions indicated as a best targeted initial response to the detected threat by autonomously initiating those actions to defend against the detected threat without any human interaction. The self-learning Artificial Intelligence models choose the best initial response and then communicate with the coordinator module to autonomously initiate that initial set of one or more actions. The self-learning AI models of normal behavior can be configured to use an architecture that is continuously updated. Thus, the self-learning Artificial Intelligence models trained on the normal behavior of users and devices associated with the network. As the models continue to operate on this network, they record and continuously update their training on the normal behavior of the network system. Accordingly, the normal behavior benchmark used by the AI models can then be varied according to the updated changes in the network.

The cyber-threat coordinator-component 100 may also include one or more observation and evaluation feedback loops. An observation and evaluation feedback loop is used to choose a best targeted initial response and the initial set of actions to take while minimizing the impact on other network devices that are i) currently active in the network and ii) that are not in breach of being outside the normal behavior benchmark. The coordinator module of the cyber-threat coordinator-component 100 directs the initial set of actions to be taken and expects i) an impact on the detected threat and ii) an effect on the rest of the active devices and active users in the network. The feedback loop monitors an actual effect on the detected threat in breach from the initial set of actions taken as well as an actual effect on the rest of the devices and users in the network not in breach from the initial set of actions taken. The observation and evaluation feedback loop is used to take a sequence of actions and evaluate the actual impact after each action in the sequence, in order to yield a best possible result to contain the detected threat while minimizing the impact on other network devices and users that are i) currently active and ii) not in breach, from different possible actions to take. Generally, at least a first action is initiated and the resulting actual effects are monitored; and then, a second action (and possibly a third and fourth action in the set of actions) in the sequence of actions is initiated and monitored with the observation and evaluation feedback loop to yield the best possible result.

The cyber defense system may have at least 3 machine learning models. Each machine learning model may be trained on specific aspects of the normal pattern of life for the system such as devices, users, network traffic flow, outputs from one or more cyber security analysis tools analyzing the system, etc. One or more machine learning models may also be trained on characteristics and aspects of all manner of types of cyber threats.

The self-learning Artificial Intelligence models are able to detect a previously unknown threat earlier as well as enact one or more autonomous responses to implement a faster response time to contain the detected threat.

Figure 2:
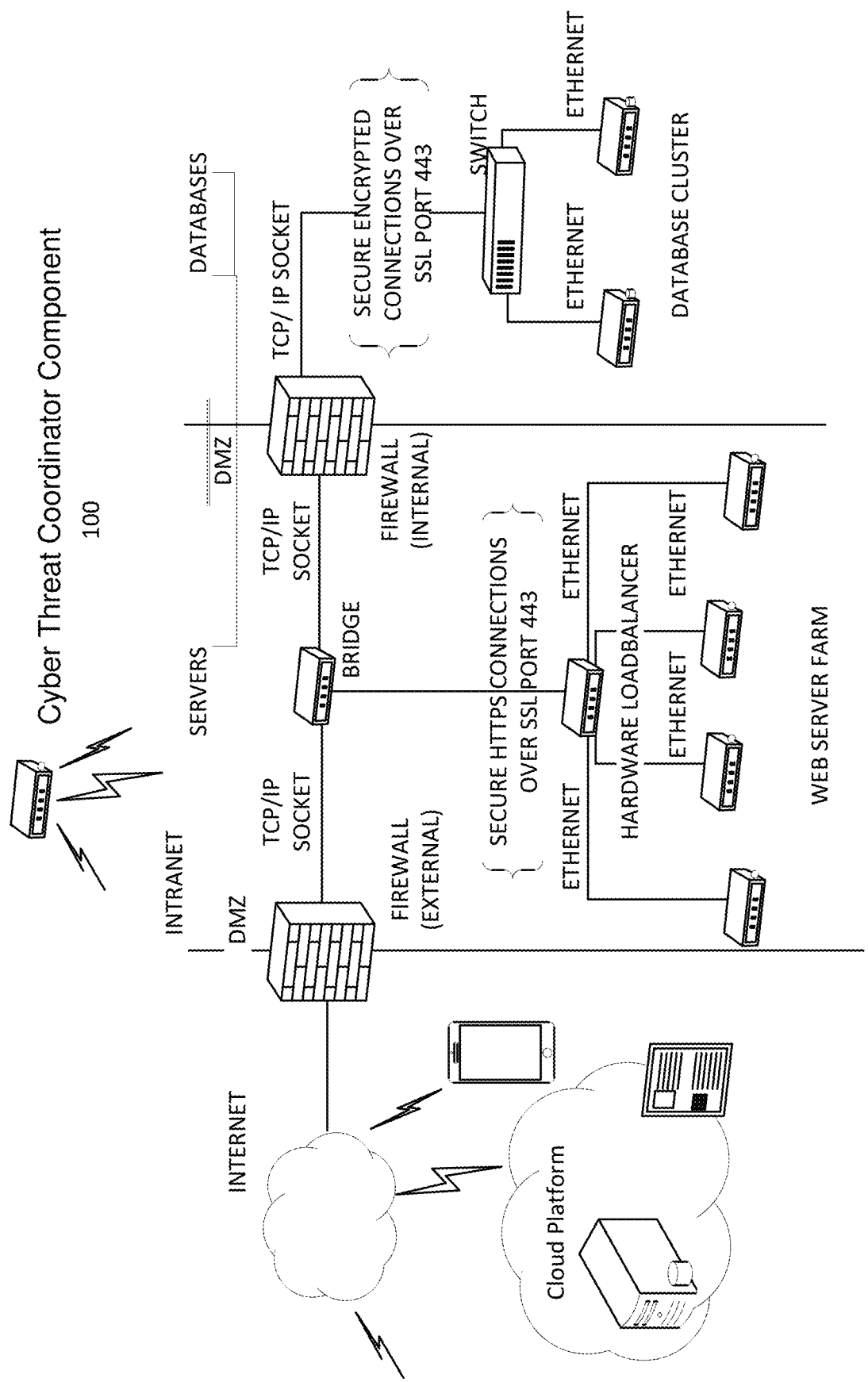
FIG. 2 illustrates a block diagram of an embodiment of a cyber-threat coordinator-component monitoring and cooperating with an example set of network devices.

FIG. 2 illustrates a block diagram of an embodiment of a cyber-threat coordinator-component monitoring and cooperating with an example set of network devices.

The example network can include one or more firewalls, one or more network switches, one or more computing devices operable by users of the network, bridges, databases, and one or more cyber-threat coordinator-components. The cyber-threat coordinator-component 100 can be an autonomous self-learning digital response coordinator that is trained specifically to control and reconfigure the actions of traditional legacy computer defenses (e.g. firewalls, switches, proxy servers, etc.) to contain threats propagated by, or enabled by, networks and the internet.

In general, the cyber-threat coordinating-component 100 can direct a firewall to grant or block access to a port. The cyber-threat coordinating-component 100 can direct a network switch to block a port or redirect to another port or to reduce the rate of traffic through the switch such as a download, etc. The cyber-threat coordinating-component 100 can direct a proxy server to dynamically decrypt traffic, divert connection to another URL, etc. The cyber-threat coordinating-component 100 can direct a device such as a computer to shut down.

The cyber-threat coordinator-component 100 can improve one or more of the computing devices themselves by containing the detected threat and minimizing consumption of CPU cycles, minimizing memory space used, and minimizing power consumption by that detected threat in one or more of the computing devices when the detected threat, such as malware/viruses, or unauthorized user actions, is contained by the initiated actions.

Figure 3:
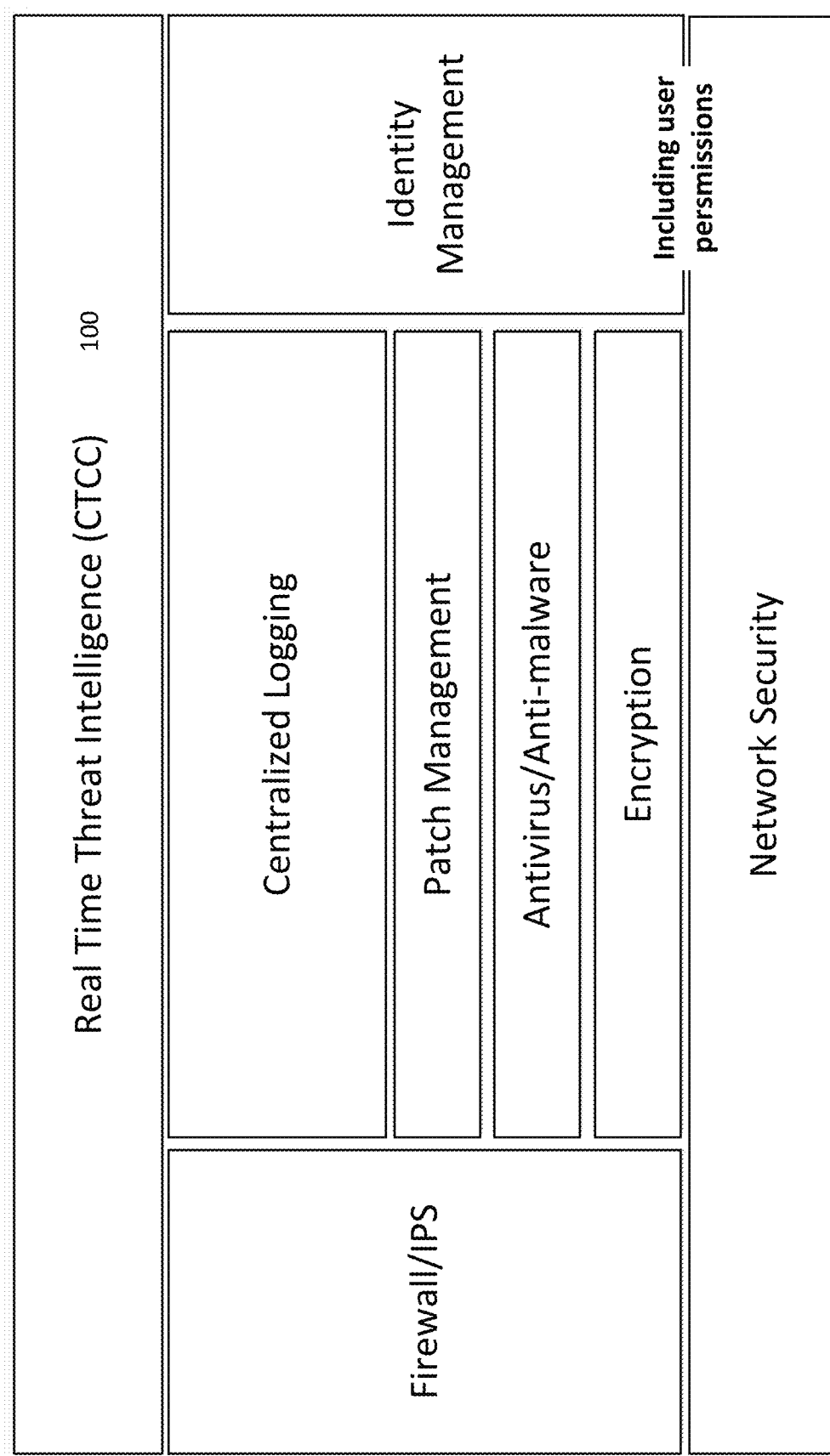
FIG. 3 illustrates a diagram of an embodiment of the cyber-threat coordinator-component cooperating and coordinating with an example set of network capabilities of various network devices.

FIG. 3 illustrates a diagram of an embodiment of the cyber-threat coordinator-component cooperating and coordinating with an example set of network capabilities of various network devices. The network devices may have various capabilities such as identity management including setting user permissions, network security controls, firewalls denying or granting access to various ports, encryption capabilities, centralize logging, antivirus anti-malware software quarantine and immunization, patch management, etc.

Some example types of capabilities of network devices; and thus, actions that can be directed from the cyber-threat coordinator-component 100:

open or block access to a port and IP address combination;
open or block access for a limited amount of time;
redirect communication to another URL or redirect the user to a specific URL;
preventing the device from reading a file share on server;
block access to specific IP addresses and/or to specific types of devices;
open or block outbound web access for a specific user and/or device;
open or block outbound DNS access for a specific user and/or device;
open or block all outbound access for a specific user and/or device;
altering the user's permissions, restricting login in for that person;
blocking a connection based on a source or destination address;
look at type of traffic and then reroute the network traffic of a specific type via security device;
slow down a transfer rate by allocating a lowest bandwidth to that port, user, or device;
quarantine files and/or send shutdown signal to a device;
close authentication to different parts of the network; and
do all of the above actions until a specified window of time is elapsed, such as an hour, or until reset by a human network administrator.

Figure 4:
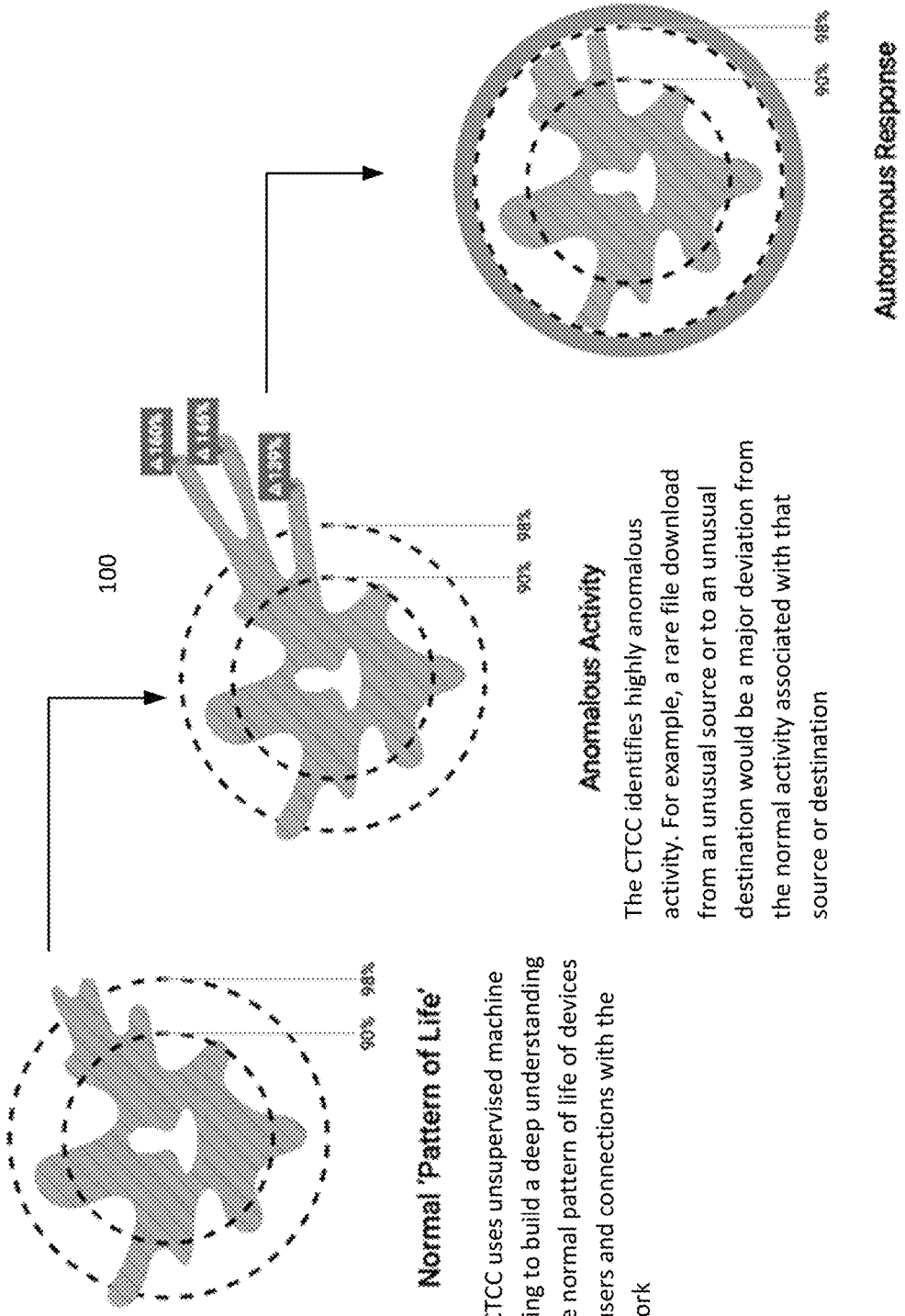
FIG. 4 illustrates a diagram of an embodiment of the cyber-threat coordinator-component using the AI models to understand the normal pattern of life of the network, identifying abnormal activity, and orchestrating an autonomous response from the network's defense system.

FIG. 4 illustrates a diagram of an embodiment of the cyber-threat coordinator-component using the AI models to understand the normal pattern of life of the network, identifying abnormal activity, and orchestrating an autonomous response from the network's defense system.

The cyber-threat coordinator-component 100 can use AI models trained with unsupervised machine learning to build a deep understanding of the normal pattern of life of devices and users and connections with the network.

The cyber-threat coordinator-component 100 can maintain a list of behavioral indicators that represent either desired behavior or undesired behavior. These indicators are dynamically produced as a reaction to events witnessed in a network.

The cyber-threat coordinator-component 100 identifies highly anomalous activity to the normal pattern. For example, a rare file download from an unusual source address or to an unusual destination address would be a major deviation from the normal activity associated with that source or destination.

The behavioral indicators produced by the cyber-threat coordinator-component 100 are produced reactively to witnessed behavior, by the comparison of this behavior to previous behavioral trends of a person or device on a computer network. These indicators are produced by artificial intelligence modules, and other statistical or mathematical mechanisms that deduce whether any given behavior should be permitted, denied or elsewise manipulated in accordance with the abilities of the third-party device. It is important to note that the specific behavior that is required to be prevented, or permitted, is not required to have been previously witnessed occurring on a network in order for a decision to be made about whether it should be interfered with.

Referring back to FIG. 2, an example that illustrates this technology might be a network firewall that is configured to consult the cyber-threat coordinator-component 100 as to each connection that is passing through it. The network firewall permits the consultation of external data sources to determine an appropriate reaction which, in this example, is limited to deny or permit.

The implementation of this feature, in this example, has been made, by the third-party, to consult the external data source periodically and cache the results locally for speed efficiency purposes.

In this example, the network behavior of a laptop is witnessed by the cyber-threat coordinator-component 100 that, when compared to a normal baseline of that laptop is indicative of undesirable behavior. In this example, this is the download, by the laptop, of a rare executable. In the context of this example, and the hypothetical network in which it occurs, this represents a departure from normal to the extent that the cyber-threat coordinator-component 100 decides the most appropriate response is to restrict the laptop's connections to only those which match its behaviorally deduced normal behavior.

In this instance the cyber-threat coordinator-component 100 makes available to the network firewall a list of behavioral indicators that the specific laptop is permitted to exhibit. All other connections not covered by these indicators should be denied. The network firewall polls the cyber-threat coordinator-component 100 and stores a copy of these indicators locally for speed of access.

When the laptop next attempts to make a connection that traverses the network firewall, the firewall consults the locally stored set of behavioral indicators supplied from the cyber-threat coordinator-component 100 to determine whether it contains a match to attempted connection. In this example, the laptop is attempting to connect to an IP address on the Internet that is not contained within the list of behavioral indicators. In this case, the firewall will deny the connection. The laptop then attempts a connection to another IP address on the Internet that the laptop frequently visits, and the cyber-threat coordinator-component 100 has judged to reflect normal activity for the laptop, in this case, the connection is present in the behavioral indicators and the connection is permitted.

In the preceding example, an anomalous event, as determined by the cyber-threat coordinator-component 100, led to the decision to only permit future connections that comply with known normal behavior. It is equally possible that the cyber-threat coordinator-component 100 decides to restrict types of behavior, rather than as given in the example, permit types of behavior.

In an example, a behavioral pattern analysis of what are the unusual behaviors of the network/system/device/user under analysis by the machine learning models may be as follows. The a cyber defense system uses unusual behavior deviating from the normal behavior and then builds a chain of unusual behavior and the causal links between the chain of unusual behavior to detect cyber threats. The unusual pattern is determined by filtering out what activities/events/alerts that fall within the window of what is the normal pattern of life for that network/system/device/user under analysis, and then the pattern of the behavior of the activities/events/alerts that are left, after the filtering, can be analyzed to determine whether that pattern is indicative of a behavior of a malicious actor—human, program, or other threat. The cyber defense system can go back and pull in some of the filtered out normal activities to help support or refute a possible hypothesis of whether that pattern is indicative of a behavior of a malicious actor. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber defense system is configurable in a user interface by each different user, enabling what type of automatic response actions, if any, the cyber defense system may take when for different types of cyber threats that are equal to or above a configurable level of threat posed by this malicious actor indicated by the pattern of behaviors under analysis.

In an embodiment, a cyber-threat coordinator-component 100 is configured to supply an artificial intelligence model that is configured to intelligently work with other third party defense systems in that customer's network against threats to create a unified defense response against a detected threat within that customer's network.

The cyber-threat coordinator-component 100 monitors and can act to regulate network behavior for all connections, users, and devices outside of their normal pattern of life by initiating actions to terminate or otherwise restrict their behavior. The normal activity for the rest of the remaining active devices and users, not in breach of their normal behavior, should remain, as much as possible, not affected by the autonomous response initiated by the cyber-threat coordinator-component 100.

The instruction to consult the cyber-threat coordinator-component 100 can be configured with the database of third-party products including border protection products, firewalls, web proxy servers, sandboxes and other third-party applications (software or hardware based). These third-party products have the ability, as part of their function within a network, to permit, deny, or in some other way interfere or manipulate network communications.

For each event that the third-party device or application witnesses, it may consult the cyber-threat coordinator-component 100 to determine an appropriate reaction. Should the information sent by the third-party device or application match any of the behavioral indicators stored within the cyber threat coordinator component, then a recommended action is provided to the third-party device.

Note, the exact implementation of this capability is dependent on the specific third-party device. For some third-party devices, the cyber-threat coordinator-component 100 may be consulted in real time at the moment a decision is required to be made, in other implementations the third-party device may poll and cache any set of behavioral indicators produced by the cyber threat coordinator component.

Figure 5:
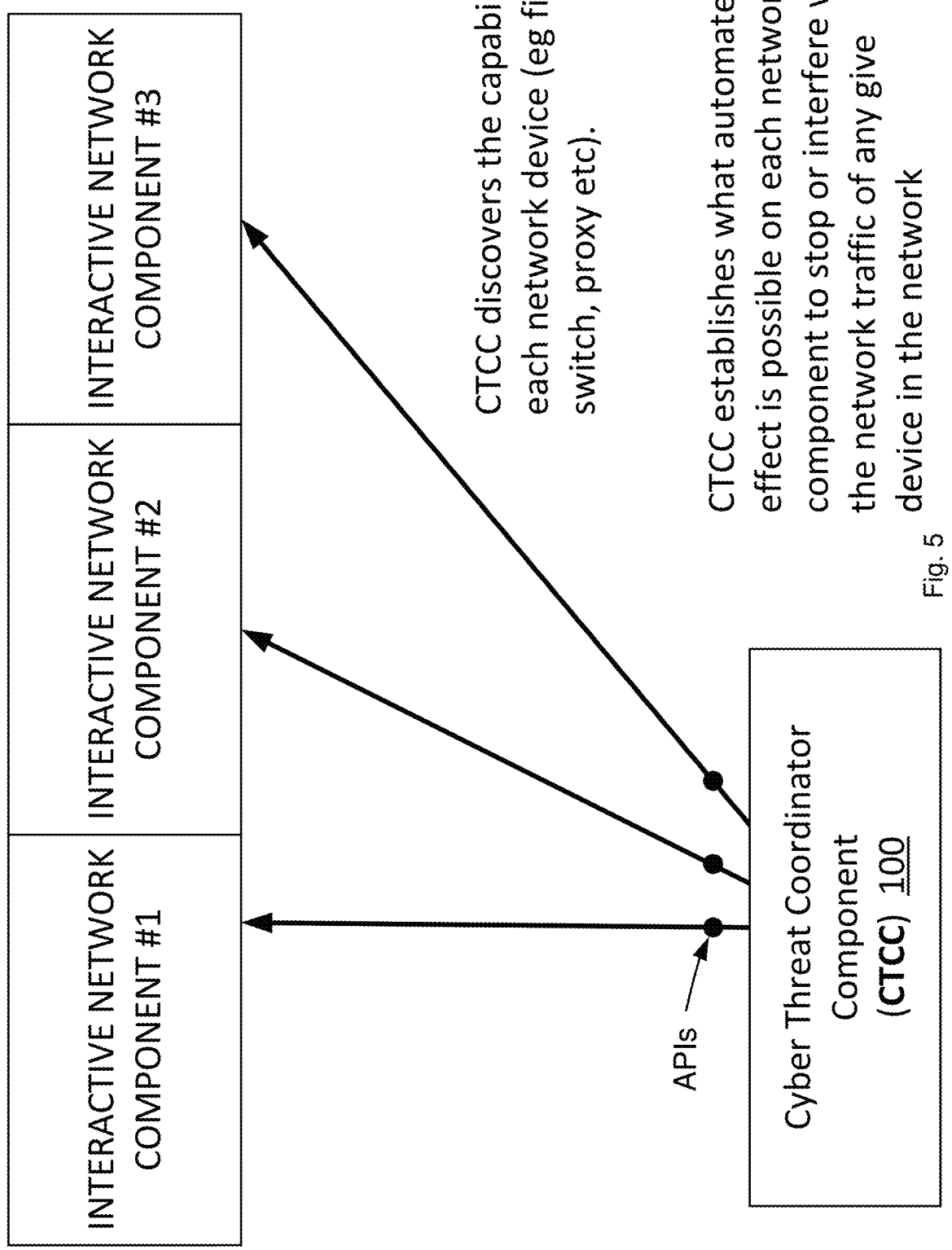
FIG. 5 illustrates a diagram of an embodiment of the cyber-threat coordinator-component discovering capabilities of network devices and establishing what automated effect is possible on each network component to stop or interfere with a detected threat.

FIG. 5 illustrates a diagram of an embodiment of the cyber-threat coordinator-component discovering capabilities of network devices and establishing what automated effect is possible on each network component to stop or interfere with a detected threat.

The cyber threat coordinator component discovers i) capabilities of each network device (e.g. firewall, switch, proxy server, and other network devices) in the network being monitored by the cyber threat coordinator component and ii) actions they can take to counter and/or contain a detected threat to the network as well as iii) the communications needed to initiate those actions. Typically, the cyber threat coordinator component discovers the capabilities of each network device (e.g. firewall, switch, proxy server, and other network devices) in the network ahead of detecting a threat. However, the cyber threat coordinator component can confirm or discover what currently are the capabilities available of each network device at the time when a threat is detected.

The cyber-threat coordinator-component discovers the capabilities of each network device, for example firewall, switch, proxy, etc. The cyber threat coordinator component may reference a database on all of the different possible types of security and network components the firewall share component will need to interact with. Alternatively, the cyber-threat coordinating component can send a communication to each of the network components in order to explore and obtain what actions it can request from that network component. Both ways explore and interpret what capabilities/actions that each network component can do from a communication from an external device.

The cyber-threat coordinator-component establishes what automated effect is possible on each network component to stop or interfere with the network traffic of any given device in that network. The cyber-threat coordinator-component will initially establish a list of all of the capabilities in all connected network devices that can be used to achieve a desired effect of reacting to this potential cyber threat. The cyber-threat coordinator-component detects with its AI models or is otherwise given notice of the initial detection of threat in the first place. The cyber-threat coordinator-component then reviews this list of options with network components it can direct them to take.

Figure 6:
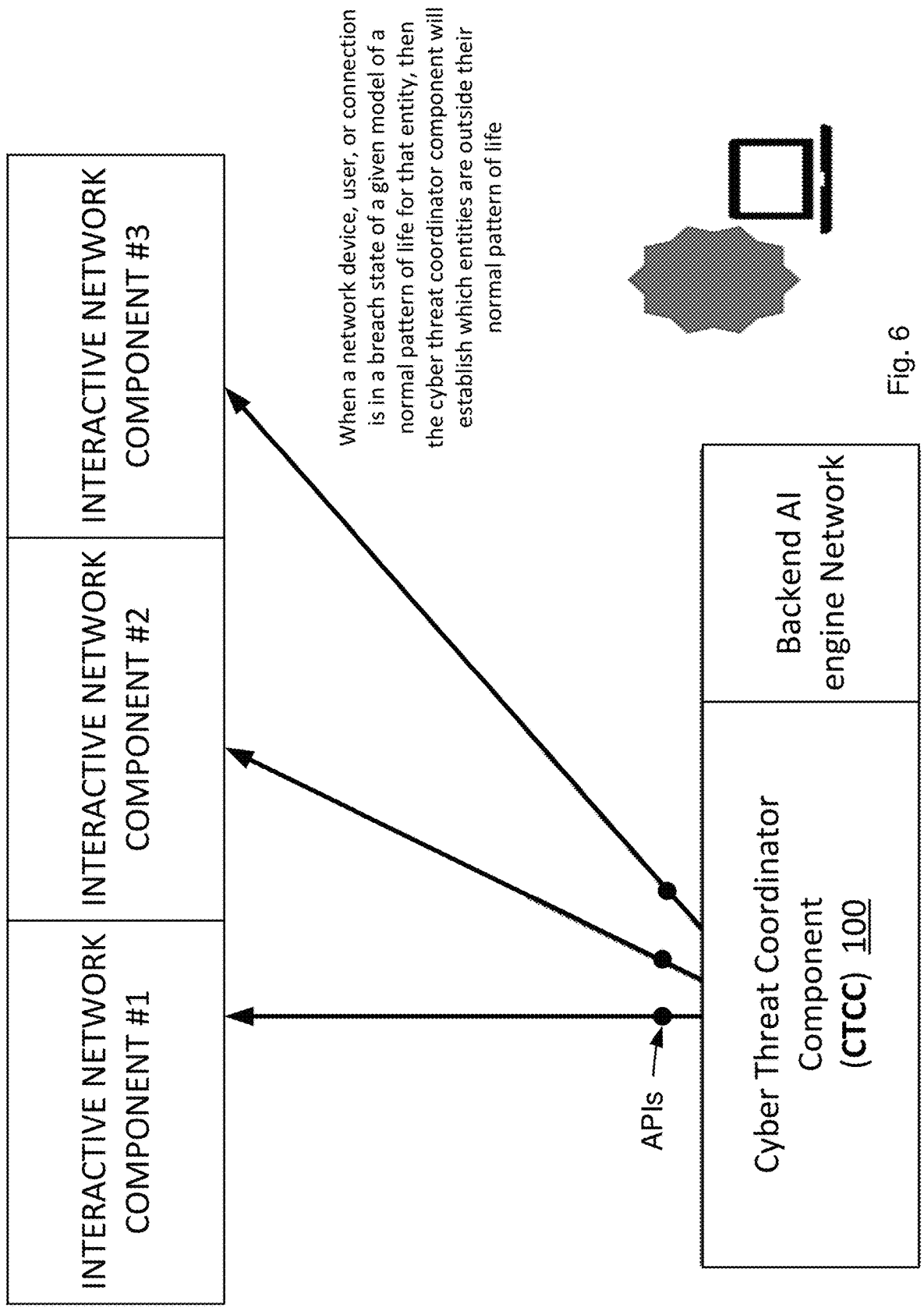
FIG. 6 illustrates a diagram of an embodiment of the cyber-threat coordinator-component that will establish which entities are outside their normal pattern of life and initiate actions to take.

FIG. 6 illustrates a diagram of an embodiment of the cyber-threat coordinator-component will establish which entities are outside their normal pattern of life and initiate actions to take.

The AI models are trained to the normal pattern of life of the network; and thus, understand normal behaviors of entities in the network. The cyber-threat coordinator-component 100 has the intelligence and trained models to dynamically create rules of normal behavior for pre-existing network components and its equipment and users within that network. A detected anomaly may fall outside of the benchmark of parameters set by the model for being normal. When a network device, user, or connection is in a breach state of a given model of a normal pattern of life for that entity, then the cyber threat coordinator component will establish which entities are outside their normal pattern of life.

The cyber-threat coordinator-component 100 also has the intelligence and trained models to take actions based upon anomalies perceived by the cyber-threat coordinator-component 100. The cyber-threat coordinator-component 100 evaluates in real-time the network connections and the network traffic in order to analyze pattern of life information regarding this network. When events occur that create anomalies for this network, then the cyber-threat coordinator-component 100, in response to an evaluation, will take one or more actions within the capabilities of the network components to contain the anomaly while minimizing an impact to other network components and other users not generating the anomaly.

The AI models are configured to use one or more mathematical functions to evaluate different factors, and then choose a best set of one or more actions from all of the possible actions, and then the coordinator module is configured to use one or more Application Programming Interfaces to translate desired actions from selected network devices into a specific language and syntax utilized by that network device in order to send the communications to the selected network devices from potentially multiple different vendors to take those desired actions. The cyber-threat coordinating-component 100 uses the set of APIs to translate commands for each different component with its own language syntax. The cyber-threat coordinating-component uses the one or more mathematical functions to generate a score for each action and/or sequence of multiple actions that can be taken in order to determine which action to choose among many possible actions to take/initiate. The score, which can also be a probability, for each one of these activities may indicate how much these actions will affect the overall system and other users of the network. The result of one or more actions to take and their calculated scores can be stacked against each other to consider factors such as likelihood of countering the threat, the severity of the threat, and impact of taking that action on users and devices not acting abnormal to the normal behavior of the network.

The cyber-threat coordinator-component 100 uses an AI model to evaluate options that each device may take and then specifies how it wants to change the behavior of a device or a user of the network acting abnormal to the normal pattern of life on the network. The cyber-threat coordinator-component 100 can initially evaluate all of the capabilities in all connected network devices that will achieve the desired effect of reacting to this potential cyber threat. However, the cyber-threat coordinator-component 100 will also evaluate the level of impact to other devices in the network should that action take place. For example, the cyber-threat coordinator-component 100 will evaluate how acceptable blocking this connection compared to blocking other connections is for the continued operations of the network. The cyber-threat coordinator-component 100 will evaluate initially which one or more of the possible actions to perform on the network components, based on the score, and then initiate the chosen actions to perform to best cause the desired targeted effect of pattern of life restriction with a least effect on other non-badly behaving devices and/or users.

In an example, after the cyber-threat coordinator-component 100 sees unusual uploads to a fileshare coming from a device with IP 10.1.1.2, the cyber-threat coordinator-component 100 decides to prevent communication from this IP address or a device from reaching the Internet over port 443 for one hour.

Thus, the cyber threat coordinator component externally directs and orchestrates at least the legacy network defense components for an overall system response to a detected threat by restricting, blocking or otherwise changing the behavior of abnormally acting device or user.

The cyber threat coordinator component can also use a feedback loop monitor to ensure the directed actions to the network components actually have the anticipated effect against the detected threat to counter and/or contain that threat. Thus, the feedback loop monitors the actual impact of the direct actions to the network components ability to constrain the threat as well as the actual impact on other network components or users that were acting normally. If either is not working or performing as anticipated, then taking a second set of actions to get to the desired containment of the detected threat while minimizing the impact on the other network components or users that were acting normally. Repeating this feedback loop of monitoring and taking actions until the desired effect against the detected threat while minimizing the impact on the other network components or users that were acting normally is achieved.

The cyber threat coordinator component does not initiate just a binary reaction of identifying a virus/malware signature 'yes' or 'no,' but ensures first set of actions work and if not, then proceeds with the remaining series of actions and monitors how these actions are working.

The mathematical functions can factor in how many other components will be affected, how many other components will both be affected and that are also currently active (i.e. not shutdown, in a sleep mode, etc.), overall impact on the network, and the level of severity of the threat, etc., which all are fed as inputs into an algorithm/mathematical function that then calculates this into a score, and compare scores of taking each action from a plurality of options to take for this event and then selects the best target action(s), which also minimize effects on other active network components and users that were acting within their normal bounds of behavior.

In an embodiment, the mathematical functions will factor the following factors:
 The number of devices not in breach that would be affected by the action.
 The relative interference to the pattern of life of all those devices not in breach (e.g. significance of stopping a communication, how often affected devices communicate via that affected port,) (e.g. whether a particular connection has a lot of traffic or rarely has traffic during this time window (during working hours vs. past normal working hours, and number of active users/devices, etc.)
 The level of severity of the threat indicated by model for the breaching device.
 Filter out devices and users who are not currently active.
 The level of effectiveness in that capability's ability to block or interfere with the specific connection.
 The impact to other devices/processes in the network should that capability be enacted.
 Popularity of a connection occurring from this device to another devices as well as Popularity of other devices and/users in the network using this connection to connect to other devices.
 Some other factors used as inputs are created dynamically by the machine learning being trained on the normal bounds of behavior of this network.

FIG. 7 illustrates a flow diagram of an embodiment of the cyber-threat coordinator-component with an example decision process to initiate a chosen set of actions to cause a best targeted change of the behavior of the detected threat acting abnormal to the normal pattern of life on the network while minimizing the impact on other network devices and users that are i) currently active and ii) not in breach of being outside the normal behavior benchmark.

The cyber-threat coordinator-component 100 uses the AI models to understand the normal pattern of life of the network; and thus, normal behaviors of entities in the network. The AI models use one or more mathematical functions to evaluate different factors, and then choose a best set of one or more actions from all of the possible actions, and then use one or more Application Programming Interfaces to translate desired actions from selected network devices into a specific language and syntax utilized by that network device in order to send the communications to the selected network devices from potentially multiple different vendors to take those desired actions. The cyber-threat coordinator-component 100 determines is this user, connection, or device within the normal pattern of life? If yes, the cyber-threat coordinator-component 100 does not need to do anything.

If no, the cyber-threat coordinator-component 100 needs to evaluate i) for each capability ii) for each network device, the following analysis. The cyber-threat coordinator-component 100 uses the one or more mathematical functions to generate a score for each of the possible actions and/or sequence of multiple possible actions that can be taken in order to determine which set of actions to choose among many possible actions to take/initiate. The one or more possible actions to take and their calculated scores will be stacked against each other to factor 1) a likelihood of containing/countering the detected threat acting abnormal with each possible set of actions, 2) a severity level of the detected threat to the network, and 3) the impact of taking each possible set of actions i) on users and ii) on devices currently active in the network not acting abnormal to the normal behavior of the network, and then initiate the chosen set of actions to cause a best change of the behavior of the detected threat acting abnormal to the normal pattern of life on the network while minimizing the impact on other network devices and users that are i) currently active and ii) not in breach of being outside the normal behavior benchmark.

The cyber-threat coordinator-component 100 determines will this block or interfere with this network connection? If no, the cyber-threat coordinator-component 100 can initiate that capability and then evaluate if any additional actions are needed. In this situation it is a simple determination for the cyber-threat coordinator-component 100 to choose an initial set of one or more actions indicated as a best initial response to the detected threat by autonomously initiating those actions to defend against the detected threat without any human interaction. The self-learning Artificial Intelligence models chose the best initial response and autonomously initiate that initial set of one or more actions.

If yes, the cyber-threat coordinator-component 100 another factor is as follows. Will this block or interfere with other users, connections, or devices? If no, the cyber-threat coordinator-component 100 directs the initial set of actions to be taken and expects i) an impact on the detected threat and ii) an effect on the rest of the active devices and active users in the network. The feedback loop monitors an actual effect on the detected threat in breach from the initial set of actions taken as well as an actual effect on the rest of the devices and users in the network not in breach from the initial set of actions taken.

If yes, then the cyber-threat coordinator-component 100 evaluates how acceptable is blocking other connections for the continued operations of the network accordance with the normal pattern of life? In addition, the cyber threat coordinator component evaluates all capabilities and the respective 'side effects' on other traffic to establish the most 'targeted' action.

The cyber-threat coordinator-component 100 uses the observation and evaluation feedback loop to take a targeted action. The cyber-threat coordinator-component 100 may take sequence of actions and evaluate the actual impact after each action in the sequence, in order to yield a best targeted result to contain the detected threat while minimizing the impact on other network devices and users that are i) currently active and ii) not in breach, from different possible actions to take. Thus, at least a first set of actions is initiated and resulting actual effects are monitored and then a second set of actions in the sequence of actions is initiated and monitored with the observation and evaluation feedback loop to yield the best possible result. The sequence can proceed to a third action, fourth action, etc. and then evaluate the results.

In addition, the cyber-threat coordinator-component 100 can be configured to self-deploy and self-configure itself as well as continuously update it's training on normal behavior of the network system that this cyber-threat coordinator-component 100 is monitoring and protecting.

The cyber-threat coordinator-component 100 is easy to roll out. The cyber-threat coordinator-component 100 may have a database on all of the different possible types of security and network components the firewall share component will need to interact with, as well as script to run to install on and then learn its network.

The automated rollout is achievable because the cyber-threat coordinator-component 100 supplies its own rules and logic for the normal behavior of the network based upon evidence seen in the network and then determines actions of existing network components. (e.g. the cyber-threat coordinator-component 100 learns that different users typically connect to different Uniform Resource Locators (URLs) and connections.)

The Basics of an Example Cyber Threat Defense System

Disclosed herein is a method and system for detection of a cyber-threat to a computing system, and any part of a network including the computing system. The method applies to both physically co-located computing/network systems as well as to globally distributed digital organizations incorporating the internet, cloud, datacenters, campuses, etc.

At a high level, the cyber-threat detection system and method determine a likelihood of a threat in accordance with received input data relating to activity on the computing system and one or more models of normal behavior associated with the computing system. The method and system receive input data associated with each entity associated with the computer system, derive metrics from the input data, the metrics are representative of characteristics of the received input data, analyze the metrics using one or more models, and determine, in accordance with the analyzed metrics and a model of normal behavior of that entity, and display a cyber-threat risk parameter indicative of a likelihood of a cyber-threat based on deviations from the normal behavior of that entity.

The method and system disclosed herein enable automatic probabilistic real-time detection of cyber threat or compromise to computers and/or networks through changes in the computers and/or networks' behavior. The method and system also permit the automatic detection of a human insider staff/sub-contractor threat as their potentially malicious behavior is reflected in changes to the pattern of usage in networked computing equipment. This is achieved mathematically without any prior knowledge of the threat type so that both established and entirely novel forms of cyber threat vector can be detected without the need for loading predetermined signature, rules or antiviral updates etc. The result is a passive network and host-wide defensive and surveillance capability.

The method and system disclosed herein have a core Bayesian probabilistic model. Three additional concepts, which are governed by the model, may then be utilized. These additional concepts may operate independently or in concert with each other. The core model permits automatic detection of cyber threats through probabilistic change in normal behavior of computers and computer networks. This is achieved with a programmatic application of an unsupervised mathematical model used for detecting behavioral change. 'Normal' is not a predefined entity but established dynamically within the model as a function of receiving and tracking the real-world activity of each node and or network.

The three additional concepts can include: 1) The ability to chain sets of user defined heuristics across a computer network and then dynamically modulate their application relative to the governing unsupervised probabilistic 'Bayesian probabilistic model; 2) Automatic network wide, self-organizing, 3D projection on a user interface of cyber threat across packet flow, connection topology and changing endpoint attributes; and 3) Detection of each component in the network through contrasting mathematical models of normal device behavior, for example, in the protocol layer.

The cyber threat defense system may be based on unsupervised machine learning and probabilistic mathematics. There are no a priori assumptions about what behavior is normal or what constitutes an attack. Instead, the cyber threat defense system derives a baseline of how each network component in the network typically works, and applies machine learning to adapt to changes in the network without declaring false security incidents, and rapidly identifies significant problems requiring an information technology team's attention.

The cyber threat defense system may have network appliances hanging on span ports and endpoint software. The cyber threat defense system may apply a set of, for example, more than 300 measurements of user, device and network activity to detect attacks in the network. The key is the Bayesian mathematical models grouping views into sets that can be analyzed and statistically processed in real time. The algorithms start defining behaviors with an analysis of big data, and then come to life with real-time dynamic checking of activity against acceptable behaviors. Importantly, the math models work to distinguish acceptable new business or network practices from suspicious activity to enhance accuracy and reduce false alarms.

The threat detection system disclosed herein may take input from physical or software probes in the network (or cloud, or endpoint) to form a huge number of metric inputs.

The metrics may be derived from an environment defined selected combination of: the analysis of full TCP/IP network packet data inspection, third party log file ingestion, endpoint file system and operating system parameters, building power and physical security events, activity within email systems or communications applications, cloud activity audit trails, and data interactions within SaaS applications etc. These inputs may be converted into a normative model of individual devices on the network and the overall topological 'shape' of the devices external and internal communications.

Thus, a method and system are used for detection of a cyber-threat to a computing system and/or the network that system is a part of. The method and system receive metrics from the probes, then derive metrics from the input data, the metrics representative of characteristics of the received input data as well as correlations between the received input data, analyzing the metrics using one or more models, and then determining, in accordance with the analyzed metrics and a model of normal behavior of each entity computing device and the network, the system then generates a cyber-threat risk parameter indicative of a likelihood of a cyber-threat and projects that on a visual threat user interface.

The method and system then update the model of normal behavior of the computing and network entities in real time in accordance with the analysis of the metrics. The received input data may include data relating to activity on the computer system associated with each computing and network entity. The derived metrics may reflect a usage of each computing device by an entity over a period of time. The derived metrics may be network traffic related metrics associated with activity of the first entity on the computer system. The derived metrics may be derived from header analysis on an Internet Layer protocol level of the computer system. The method may further comprise selecting the plurality of metrics from a range of possible metrics before deriving the plurality of metrics. The one or more models may include a first model arranged to analyze data for detecting a first type of threat. The one or more models may include a second model arranged to analyze data for detecting a second type of threat, etc. The one or more models may include a third model modeling the normal behavior of a second component in the network, etc. The cyber-threat risk parameter may be a probability of the likelihood of a threat. The probability may be determined using a recursive Bayesian estimation. The method may further comprise determining whether or not there is a threat by comparing the cyber-threat risk parameter with a threshold. The threshold may be a moving threshold. The cyber-threat risk parameter may be determined by comparing the analyzed metrics with the model of normal behavior of the first entity. The method and system may further comprise predicting an expected behavior of each entity based on the model of normal behavior. The determining the cyber-threat risk parameter may comprise comparing the analyzed metrics with the expected behavior. The method and system may further comprise receiving input data associated with a second entity (and a third entity and fourth entity etc.). The determining the cyber-threat risk parameter takes the input data associated with the multiple other entities into consideration.

Note, the computing system may be a single computer. Alternatively, the computing system may be part of a network of computing devices and/or other electronic devices. The network of computing devices may also be a collection of networks.

The models develop a pattern of life for each user, computing device, and network based on various data gathered regarding the users, computing devices, and networks. The models are used for automatic real-time cyber-threat detection and autonomous disruptive response. A model may be an unsupervised mathematical model. A model may be a normative model. The model may be a self-learning model. Probes may collect and even analyze the metrics. The system may have a non-frequentist architecture. The model may be ever changing and updating on what is normal behavior. The model may comprise user-defined heuristics. The model may be updated when new data is received. The model may be updated when new data is received that is deemed within the limits of normal behavior.

Activity by the user may comprise interactions with other entities of the computer system. When the entity is a user (i.e. user account) these interactions may be with other users or with devices forming part of the computer system.

The metrics may represent characteristics of the received input data. The characteristics may include quantification of the input data. The characteristics may include simplification of the input data. The threshold used for determining if there is a threat may be a moving threshold. The moving threshold may be varied according to changes in the computer system.

The presence of unexpected behavior may be indicative of a threat. Also, the absence of expected behavior may be indicative of a threat.

The determining of the cyber-threat risk parameter taking the input data associated with the second entity into consideration may involve analyzing causal links between data associated with the first entity and data associated with the second entity. The link between data associated with any number of entities on the computer system may be taken into consideration when performing the threat detection method.

FIG. 8 illustrates an example cyber threat defense system protecting an example network. The example network FIG. 8 illustrates a network of computer systems 50 using a threat detection system. The system depicted by FIG. 8 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 8.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the threat detection system installed on the computer 1.

The cyber defense self-learning platform uses machine-learning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine learning is at the forefront of the fight against automated and human-driven cyber-threats, overcoming the limitations of rules and signature-based approaches:

The machine learning learns what is normal within a network—it does not depend upon knowledge of previous attacks.

The machine learning thrives on the scale, complexity and diversity of modern businesses, where every device and person is slightly different.

The machine learning turns the innovation of attackers against them—any unusual activity is visible.

The machine learning constantly revisits assumptions about behavior, using probabilistic mathematics.

The machine learning is always up to date and not reliant on human input. Utilizing machine learning in cyber security technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

Machine learning can approximate some human capabilities to machines, such as:

Thought: it uses past information and insights to form its judgments;

Real time: the system processes information as it goes; and

Self-improving: the model's machine learning understanding is constantly being challenged and adapted, based on new information.

New unsupervised machine learning therefore allows computers to recognize evolving threats, without prior warning or supervision.

Unsupervised Machine Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but can independently classify data and detect compelling patterns.

The cyber threat defense system's unsupervised machine learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative:

- Threats from within, which would otherwise go undetected, can be spotted, highlighted, contextually prioritized and isolated using these algorithms.
- The application of machine learning has the potential to provide total network visibility and far greater detection levels, ensuring that networks have an internal defense mechanism.
- Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data, and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include:

Server access;
Data access;
Timings of events;
Credential use;
DNS requests; and
other similar parameters.

Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices.

Clustering: At a glance:
- Analyzes behavior in the context of other similar devices on the network;
- Algorithms identify naturally occurring groupings of devices—impossible to do manually; and
- Simultaneously runs a number of different clustering methods to inform the models.

Network Topology

Any cyber threat detection system must also recognize that a network is far more than the sum of its individual parts, with much of its meaning contained in the relationships among its different entities, and that complex threats can often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2 from that raw data.

The raw data sources include, but are not limited to:
Raw network IP traffic captured from an IP or other network TAP or SPAN port;
Machine generated log files;
Building access ("swipe card") systems;
IP or non IP data flowing over an Industrial Control System (ICS) distributed network;
Individual machine, peripheral or component power usage;
Telecommunication signal strength; and/or
Machine level performance data taken from on-host sources (CPU usage/memory usage/disk usage/disk free space/network usage/etc.)

From these raw sources of data, a large number of metrics can be derived each producing time series data for the given metric. The data are bucketed into individual time slices (for example, the number observed could be counted per 1 second, per 10 seconds or per 60 seconds), which can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, it is common for a large number of metrics relating to a wide range of potential threats to be obtained. Communications from components in the network contacting known suspect domains.

The actual metrics used are largely irrelevant to the Bayesian probabilistic system, which is described here, but some examples are provided below.

Metrics derived from network traffic could include data such as:
The number of bytes of data entering or leaving a networked device per time interval.
File access.
The commonality/rarity of a communications process
Invalid SSL certification.
Failed authorization attempt.
Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:
The number of multicasts per time interval originating from a networked device and intended to reach publicly addressable IP ranges.
The number of internal link-local IP Broadcast requests originating from a networked device.
The size of the packet payload data.
The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:

The number of DNS requests a networked device generates per time interval, again either to any definable target network range or in total.

The number of SMTP, POP or IMAP logins or login failures a machine generates per time interval.

The number of LDAP logins or login failures a generated.

Data transferred via file sharing protocols such as SMB, SMB2, FTP, etc.

Logins to Microsoft Windows Active Directory, SSH or Local Logins to Linux or

Unix Like systems, or other authenticated systems such as Kerberos.

The raw data required to obtain these metrics may be collected via a passive fiber or copper connection to the networks internal switch gear, from virtual switching implementations, from cloud based systems, or from communicating devices themselves. Ideally the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, detectors carry out analysis of the second order metrics. Detectors are discrete mathematical models that implement a specific mathematical method against different sets of variables with the target network. For example, HMM may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes consist of value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in and/or on online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

At step S4, the threat detection system computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the Bayesian probabilistic has computed to be most relevant within the observed network and/or machines. Furthermore, the pattern of life analysis identifies how a human and/or machine behaves over time, i.e. when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine learning/Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

In order to improve the accuracy of the system, a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection is able to scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system can communicate with the server(s). The client computing system can include, for example, the software application or the hardware-based system in which may be able exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system 802B) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A method for a cyber threat protection system, comprising:

analyzing input data on entities associated with a network using one or more models that are self-learning Artificial Intelligence models trained on a normal behavior of users and devices associated with the network;

where a normal behavior benchmark is used by a given model as a benchmark of parameters that correspond to a normal pattern of life for the network, and the normal behavior benchmark allows that self-learning model to spot behavior on the network that falls outside the parameters set by the normal behavior benchmark;

comparing the analyzed input data on one or more of the entities associated with the network to the benchmark of parameters that correspond to the normal pattern of life for the devices and users of the network;

identifying at least one of a device, a user, or a combination of both, that are in a breach state of the benchmark of parameters, utilized by the Artificial Intelligence models, that correspond to the normal pattern of life for the network;

sending an external communication to selected network devices in order to initiate actions with that network device in order to counter a behavior of a detected threat of at least one of i) a user, ii) a device, iii) both a user and a device, iv) a set of users, v) a set of devices acting abnormal to the normal pattern of life on the network, and vi) various combinations of these entities; while minimizing an impact on other network devices and users that are i) currently active in the network and ii) that are not in breach of being outside the normal behavior benchmark;

using an observation and evaluation feedback loop to choose a best initial response and the initial set of actions to take while minimizing the impact on other network devices that are i) currently active in the network and ii) that are not in breach of being outside the normal behavior benchmark, where a cyber-threat coordinator-component directs the initial set of actions to be taken and expects i) an impact on the detected threat and ii) an effect on the rest of the active devices and active users in the network, and where the feedback loop monitors an actual effect on the detected threat in breach from the initial set of actions taken as well as an actual effect on the rest of the devices and users in the network not in breach from the initial set of actions taken; and using the observation and evaluation feedback loop to take a sequence of actions and evaluate the actual impact after each action in the sequence, in order to yield a best possible result to contain the detected threat while minimizing the impact on other network devices and users that are i) currently active and ii) not in breach, from different possible actions to take, where at least a first action is initiated and resulting actual effects are monitored and then a second action in the sequence of actions is initiated and monitored with the observation and evaluation feedback loop to yield the best possible result.

2. The method for the cyber threat protection system of claim 1, further comprising:
i) discovering capabilities of each network device in the network being monitored and ii) discovering actions they can take to counter and/or contain the detected threat to the network, as well as iii) discovering the communications needed to initiate those actions.

3. The method for the cyber threat protection system of claim 2, further comprising:
coordinating the capabilities of two or more network devices that are selected to counter the detected threat acting abnormal to the normal pattern of life by sending an external communication to each selected network device in order to initiate actions with that network device in order to counter the behavior of the detected threat while minimizing the impact on other network devices and users that are i) currently active in the network and ii) that are not in breach of being outside the normal behavior benchmark.

4. The method for the cyber threat protection system of claim 1, further comprising:
using the AI models to understand the normal pattern of life of the network; and thus, normal behaviors of entities in the network, where the AI models use one or more mathematical functions to evaluate different factors, and then choose a best set of one or more actions from all of the possible actions, and then use one or more Application Programming Interfaces to translate desired actions from selected network devices into a specific language and syntax utilized by that network device in order to send the communications to the selected network devices from potentially multiple different vendors to take those desired actions.

5. The method for the cyber threat protection system of claim 4, further comprising:
using the one or more mathematical functions to generate a score for each of the possible actions and/or sequence of multiple possible actions that can be taken in order to determine which set of actions to choose among many possible actions to initiate, where the one or more possible actions to take and their calculated scores will be stacked against each other to factor 1) a likelihood of containing the detected threat acting abnormal with each possible set of actions, 2) a severity level of the detected threat to the network, and 3) the impact of taking each possible set of actions i) on users and ii) on devices currently active in the network not acting abnormal to the normal behavior of the network, and then initiate the chosen set of actions to cause a best counter of the behavior of the detected threat acting abnormal to the normal pattern of life on the network while minimizing the impact on other network devices and users that are i) currently active and ii) not in breach of being outside the normal behavior benchmark.

6. The method for the cyber threat protection system of claim 1, further comprising:
choosing an initial set of one or more actions indicated as a best initial response to the detected threat by autonomously initiating those actions to defend against the detected threat without any human interaction, where the self-learning Artificial Intelligence models choose the best initial response and autonomously initiate that initial set of one or more actions.

7. The method for the cyber threat protection system of claim 1, wherein the self-learning models of normal behavior use an architecture that is continuously updated, where the self-learning Artificial Intelligence models trained on the normal behavior of users and devices associated with the network, record and continuously update their training on the normal behavior of the network system that a cyber-threat coordinator-component using the self-learning Artificial Intelligence models is monitoring and protecting, and where the normal behavior benchmark is varied according to the updated changes in the network.

8. A non-transitory computer readable medium comprising computer readable code operable, when executed by one or more processing apparatuses in the computer system to instruct a computing device to perform the method of claim 1.

9. A cyber-threat coordinator-component, comprising:
an analysis module configured to analyze input data on entities associated with a network using one or more self-learning Artificial Intelligence models trained on a normal behavior of users and devices associated with the network;
where a normal behavior benchmark is used by a given AI model as a benchmark of parameters that correspond to a normal pattern of life for the network, and the normal behavior benchmark allows that self-learning model to spot behavior on the network that falls outside the parameters set by the normal behavior benchmark;
a comparison module configured to compare the analyzed input data on one or more of the entities associated with the network utilized by the self-learning Artificial Intelligence models trained on the normal pattern of life for the network;
where the comparison module is further configured to identify at least one of a device, a user, or a combination of both, that are in a breach state of the benchmark of parameters, utilized by the Artificial Intelligence models, that correspond to the normal pattern of life for the network;
a coordinator module configured to cooperate with the comparison module and send an external communication to selected network devices in order to initiate actions with that network device in order to counter a behavior of a detected threat of a user and/or a device acting abnormal to the normal pattern of life on the network while minimizing an impact on other network devices and users that are i) currently active in the network and ii) that are not in breach of being outside the normal behavior benchmark;
an observation and evaluation feedback loop is used to choose a best targeted initial response and the initial set of actions to take while minimizing the impact on other network devices that are i) currently active in the network and ii) that are not in breach of being outside the normal behavior benchmark, where the coordinator module of the cyber-threat coordinator-component directs the initial set of actions to be taken and expects i) an impact on the detected threat and ii) an effect on the rest of the active devices and active users in the network, and where the feedback loop monitors an actual effect on the detected threat in breach from the initial set of actions taken as well as an actual effect on the rest of the devices and users in the network not in breach from the initial set of actions taken; and where the observation and evaluation feedback loop is used to take a sequence of actions and evaluate the actual impact after each action in the sequence, in order to yield a best possible result to contain the detected threat while minimizing the impact on other network devices and users that are i) currently active and ii) not in breach, from different possible actions to take, where at least a first action is initiated and resulting actual effects are monitored and then a second action in the sequence of actions is initiated and monitored with the observation and evaluation feedback loop to yield the best possible result.

10. The apparatus for the cyber threat protection system of claim 9, further comprising:
a discovery module configured to i) discover capabilities of each network device in the network being monitored and ii) discover actions they can take to counter and/or contain the detected threat to the network, as well as iii) discover the communications needed to initiate those actions.

11. The apparatus for the cyber threat protection system of claim 10, further comprising:
where the coordinator module is further configured to coordinate the capabilities of two or more network devices that are selected to counter the detected threat acting abnormal to the normal pattern of life by sending an external communication to each selected network device in order to initiate actions with that network device in order to counter the behavior of the detected threat while minimizing the impact on other network devices and users that are i) currently active in the network and ii) that are not in breach of being outside the normal behavior benchmark.

12. The apparatus for the cyber threat protection system of claim 9, further comprising:
where the AI models are trained on the normal pattern of life of the network; and thus, normal behaviors of entities in the network, where the AI models are configured to use one or more mathematical functions to evaluate different factors, and then choose a best set of one or more actions from all of the possible actions, and then the coordinator module is configured to use one or more Application Programming Interfaces to translate desired actions from selected network devices into a specific language and syntax utilized by that network device in order to send the communications to the selected network devices from potentially multiple different vendors to take those desired actions.

13. The apparatus for the cyber threat protection system of claim 12, further comprising:
where the AI models are configured to use the one or more mathematical functions to generate a score for each of the possible actions and/or sequence of multiple possible actions that can be taken in order to determine which set of actions to choose among many possible actions to initiate, where the one or more possible actions to take and their calculated scores will be stacked against each other to factor 1) a likelihood of containing the detected threat acting abnormal with each possible set of actions, 2) a severity level of the detected threat to the network, and 3) the impact of taking each possible set of actions i) on users and ii) on devices currently active in the network not acting abnormal to the normal behavior of the network, and then communicate with the coordinator module to initiate the chosen set of actions to cause a best targeted counter of the behavior of the detected threat acting abnormal to the normal pattern of life on the network while minimizing the impact on other network devices and users that are i) currently active and ii) not in breach of being outside the normal behavior benchmark.

14. The apparatus for the cyber threat protection system of claim 9, further comprising:
where the AI models are configured to choose an initial set of one or more actions indicated as a best targeted initial response to the detected threat by autonomously initiating those actions to defend against the detected threat without any human interaction, where the self-learning Artificial Intelligence models choose the best initial response and then communicate with the coordinator module to autonomously initiate that initial set of one or more actions.

15. The apparatus for the cyber threat protection system of claim 9, wherein the self-learning models of normal behavior are configured to use an architecture that is continuously updated, where the self-learning Artificial Intelligence models trained on the normal behavior of users and devices associated with the network, and record and continuously update their training on the normal behavior of the network system, and where the normal behavior benchmark is varied according to the updated changes in the network.

16. A network, comprising:
one or more firewalls;
one or more network switches;
one or more computing devices operable by users of the network; and
a cyber-threat coordinator-component that includes:
a comparison module configured to identify at least one of a device, a user, or a combination of both, that are in a breach state of the benchmark of parameters, utilized by AI models, that correspond to the normal pattern of life for the network, and
a coordinator module configured to send an external communication to selected network devices in order to initiate actions with that the selected network devices in order to change a behavior of a detected threat of at least one of a user and/or a device acting abnormal to the normal pattern of life on the network while minimizing an impact on other network devices and users that are i) currently active in the network and ii) that are not in breach of being outside the normal behavior benchmark,
where an observation and evaluation feedback loop is used to choose a best targeted initial response and the initial set of actions to take while minimizing the impact on other network devices that are i) currently active in the network and ii) that are not in breach of being outside the normal behavior benchmark, where the coordinator module of the cyber-threat coordinator-component directs the initial set of actions to be taken and expects i) an impact on the detected threat and ii) an effect on the rest of the active devices and active users in the network, and where the feedback loop monitors an actual effect on the detected threat in breach from the initial set of actions taken as well as an actual effect on the rest of the devices and users in the network not in breach from the initial set of actions taken,
where the observation and evaluation feedback loop is used to take a sequence of actions and evaluate the actual impact after each action in the sequence, in order to yield a best possible result to contain the detected threat while minimizing the impact on other network devices and users that are i) currently active and ii) not in breach, from different possible actions to take, where at least a first action is initiated and resulting actual effects are monitored and then a second action in the sequence of actions is initiated and monitored with the observation and evaluation feedback loop to yield the best possible result, and where the cyber-threat coordinator-component improves one or more of the computing devices themselves by containing the detected threat and minimizing an amount of CPU cycles, memory space, and power consumed by that detected threat in a first computing device when the detected threat is contained by the initiated actions.

\* \* \* \* \*